(12) United States Patent
Skoog

(10) Patent No.: US 6,297,806 B1
(45) Date of Patent: Oct. 2, 2001

(54) CONNECTING DEVICE FOR INPUTTING INFORMATIONAL SIGNALS

(75) Inventor: Jonas Skoog, Honeröd (SE)

(73) Assignee: Nassko Telecom AB, Göteborg (SE)

( * ) Notice: Subject to any disclaimer, the term of this patent is extended or adjusted under 35 U.S.C. 154(b) by 0 days.

(21) Appl. No.: 09/308,885

(22) PCT Filed: Nov. 25, 1997

(86) PCT No.: PCT/SE97/01973

§ 371 Date: Jun. 22, 1999

§ 102(e) Date: Jun. 22, 1999

(87) PCT Pub. No.: WO98/24103

PCT Pub. Date: Jun. 4, 1998

(30) Foreign Application Priority Data

Nov. 27, 1996 (SE) .................................................... 9604351

(51) Int. Cl.[7] .................................................... G09G 5/08
(52) U.S. Cl. .................................................... 345/160; 341/22
(58) Field of Search .................................... 345/160, 169, 345/157, 168, 172; 341/22, 23; 200/5 A, 5 R, 341; 273/148 B; 463/37

(56) References Cited

U.S. PATENT DOCUMENTS

| | | |
|---|---|---|
| 3,005,055 | 10/1961 | Mattke . |
| 4,687,200 | 8/1987 | Shirai . |
| 5,408,621 | 4/1995 | Ben-Arie . |
| 5,563,630 | * 10/1996 | Tsakiris et al. ...................... 345/160 |
| 5,716,274 | * 2/1998 | Goto et al. ............................ 345/169 |
| 5,815,139 | * 9/1998 | Yoshikawa et al. ................. 345/160 |

FOREIGN PATENT DOCUMENTS 2-144-528-A   3/1985   (GB) .

* cited by examiner

*Primary Examiner*—Regina Liang
(74) *Attorney, Agent, or Firm*—Burns, Doane, Swecker & Mathis, L.L.P.

(57) ABSTRACT

The invention concerns a connecting device which is intended to replace a keypad of a hand-held electronic device, such as e.g. a mobile telephone or a remote control device. A connecting disc (1) forming part of the device is tiltable about its center in different directions from a neutral position in order to bring electrical contact means (6, 10, 11) together for the purpose of generating electrical information signals. On one of its sides the connecting disc (1) is provided with alternating crests (4) and dales (5) departing radially from the center of the disc (1). A contact field (6) is provided on each crest (4). A printed circuit card (7) cooperating with the connecting disc (1) is formed with alternating crests (8) and dales (9). Each dale (9) is in this case provided with at least one pair of contacts (10, 11). The connecting disc (1) is arranged, by being tilted in any direction, to slide by means of a crest (4) into a dale (9) in the circuit card (7) to close the circuit between the contact field (6) on said crest (4) and the pair of contacts (10, 11) on said dale (9).

4 Claims, 3 Drawing Sheets

CONNECTING DEVICE FOR INPUTTING INFORMATIONAL SIGNALS

TECHNICAL FIELD

The present invention relates to a connecting device which is intended to replace a keypad, for instance in a mobile telephone or a hand-held computer.

1. Background of the Invention

From U.S. Pat. No. 5,408,621 is previously known a device for inputting data into a computer. The device comprises a couple of cooperating control knobs, each one of which is tiltable about a centre hub from a neutral, inactive position into different tilted active, current-transmission positions. Each combination of two such tilted positions, one for each control knob, generates a signal to the computer. Holding one hand about each control knob, the user controls the knobs by a turn of his wrist.

Another principally similar device is disclosed in U.S. Pat. No. 3,005,055. This device features depression of the edge portion of a disc against spring action, into various tilted disc positions in which contacts are closed, thereby generating an electric signal. To depress the edge portion, the operator uses one finger which is applied against a protruding area of the disc, which area may be marked with characters in order to facilitate the generation of the intended, correct signal.

Both prior-art devices referred to above suffer from the disadvantage of having a mechanical structure including a large number of movable parts, which makes them comparatively complicated and expensive to manufacture, and for that very reason they easily fail.

2. Summary of the Present Invention

The present invention provides a connecting device comprising a resiliently mounted connecting disc made from an electrically non-conductive material, said disc being tiltable about its centre in different directions from a neutral position in order to bring electrical contact means together for the purpose of generating electrical information signals.. The connecting disc is the only movable part of the device. Consequently, the connecting device is of an extremely simple structural design and therefore very reliable and easier to manufacture than hitherto known devices. In addition, the connecting device is ergonomically designed and may be operated conveniently with the aid of the thumb. The features characterising the device appear from the appended claims.

BRIEF DESCRIPTION OF THE FIGURES

The invention will be explained in more detail in the following with reference to the accompanying drawings, wherein.

DETAILED DESCRIPTION OF THE PRESENT INVENTION

Figure 1A:
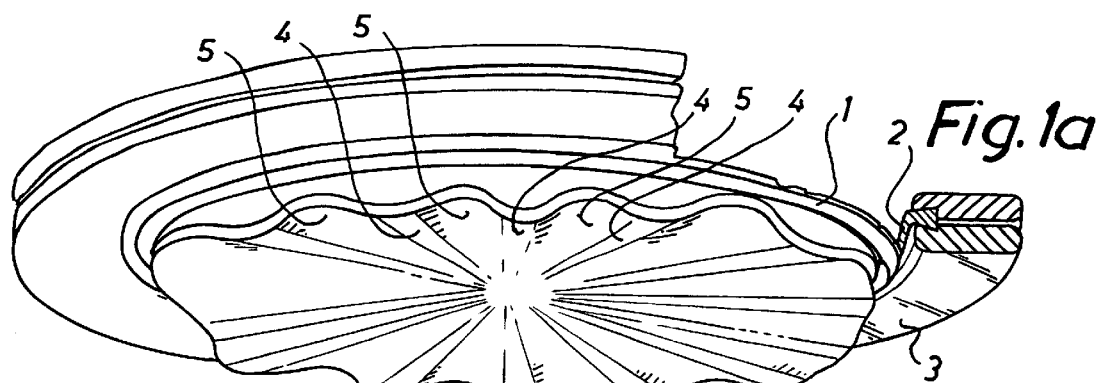
FIG. 1a is a perspective incomplete view as seen obliquely from below of the connecting disc incorporated in the device.
Figure 1B:
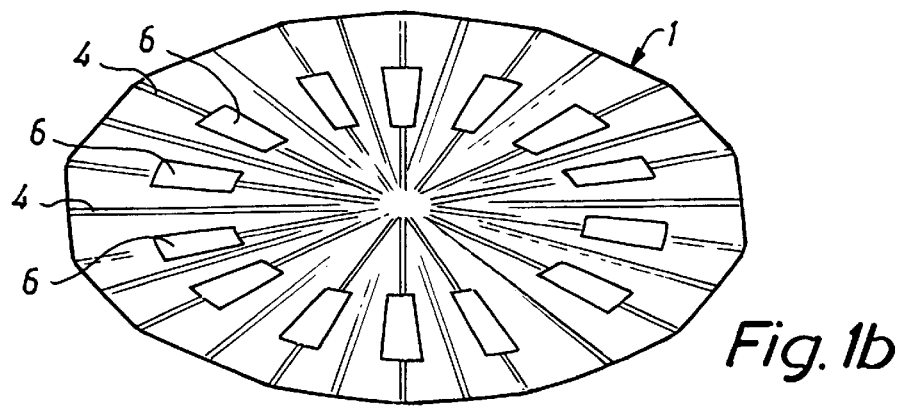
FIG. 1b is a plan view of the connecting device.

The connecting device comprises a connecting disc 1, which is the most essential component of the device. The disc is resiliently mounted in an elastic membrane 2 which is fastened in a rim 3 extending peripherally around the connecting disc 1. As appears from FIG. 1a the inner or bottom face of the connecting disc 1 is formed with alternating crests 4 and dales 5 extending radially from the centre of the disc 1. Each crest 4 has a contact field 6, which for the sake of improved clarity is shown not in FIG. 1a but in FIG. 1b.

Figure 2A:
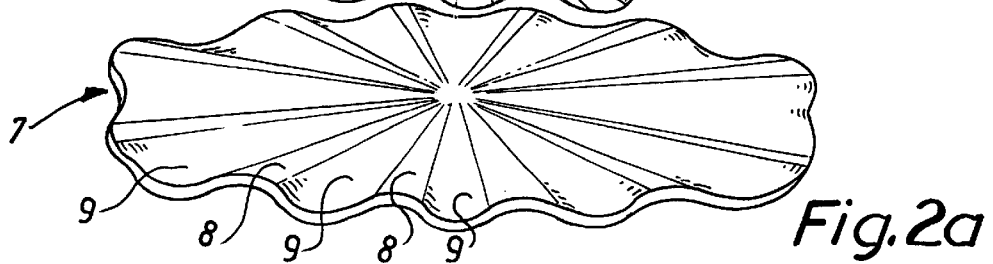
FIG. 2a is a perspective incomplete view of a printed circuit card incorporated in the connecting device.
Figure 2B:
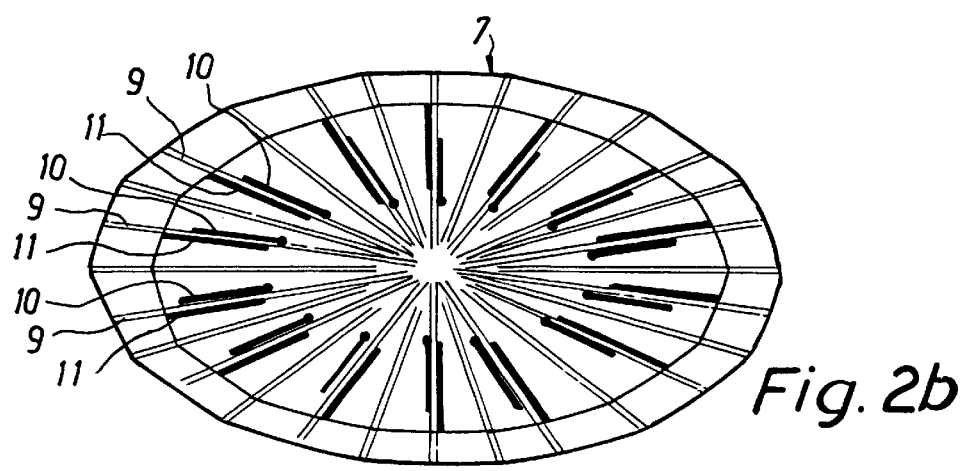
FIG. 2b is a plan view of the card.

A printed circuit card 7 is located underneath or internally of the connecting disc 1. Like the connecting disc 1, the card is made from an electrically nonconductive material, and again like the connecting disc 1, the card is formed with crests 8 and dales 9. As appears from FIG. 2b but is excluded from FIG. 2a, each dale 9 is fitted with a pair of contacts-means 10, 11 which are connected to some electronic equipment via electric conductors, not shown.

In the neutral position of the connecting disc 1 no electric circuit is closed. By exerting pressure on the connecting disc 1, making it tilt in any one direction, one of the crests 4 of the connecting disc 1 will slide into a dale 9 in the circuit card 7, closing the circuit between the contact field 6 of that crest 4 and the pair of contacts 10, 11 of the corresponding dale 9. In this manner, an information signal is produced. Once the pressure on the connecting disc 1 ceases, the latter springs back to its neutral position.

Figure 3:
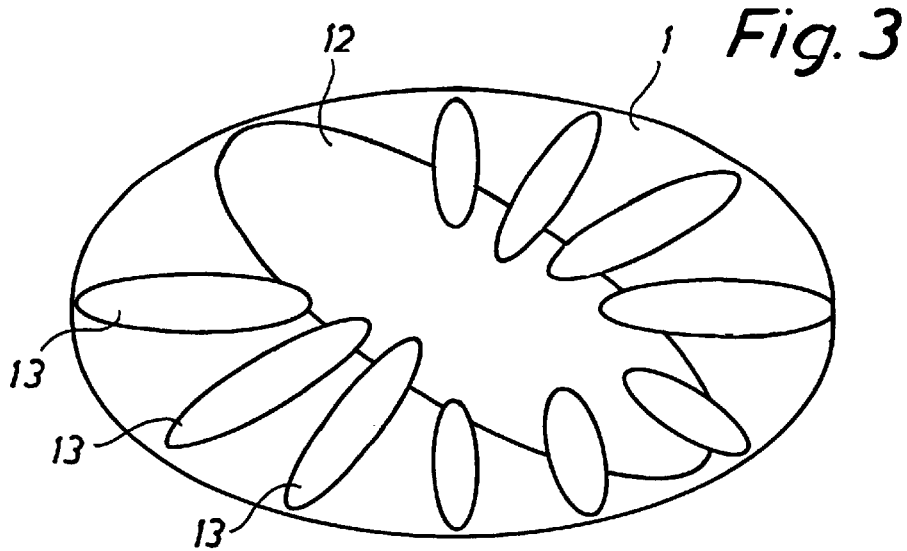
FIG. 3 is a schematic view of the top face of the connecting device.
Figure 4:
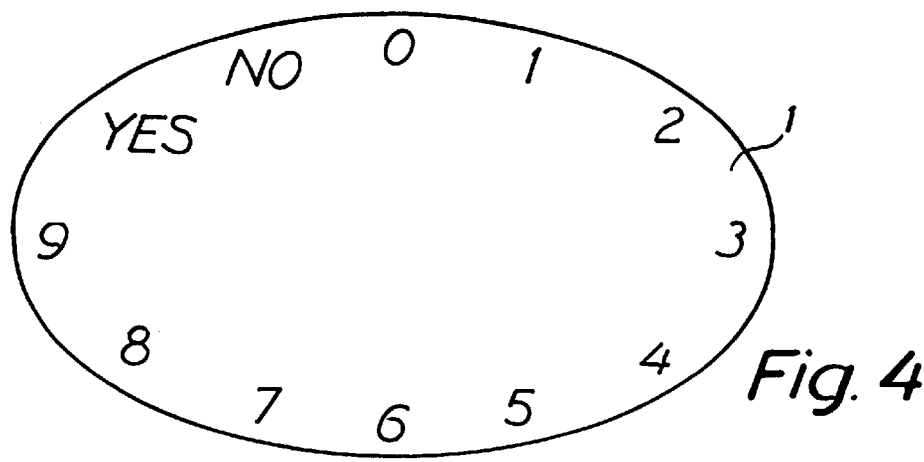
FIG. 4 is a view in accordance with one exemplary embodiment of the top face of the connecting device.
Figure 5:
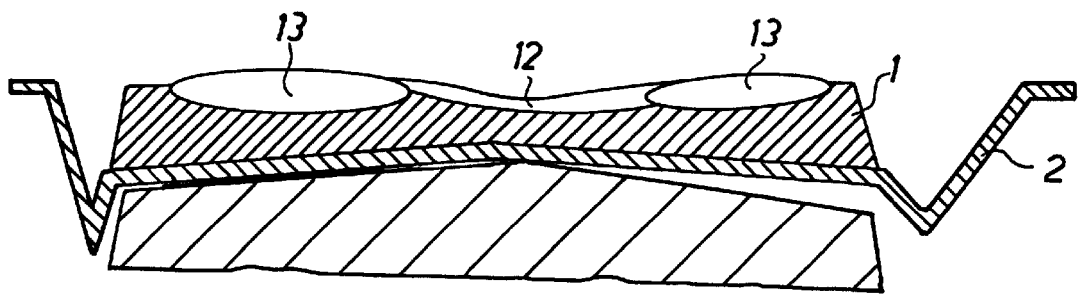
FIG. 5 is a schematic cross-sectional view through the connecting device.

FIG. 3 illustrates a suitable design of the upper or outer face of the connecting disc 1. From an elongate depression 12, protrusions 13 depart transversely in various directions, see also FIG. 5 The depression 12 is made use of as a surface of support: to the thumb of one hand, and by means of the thumb the operator tilts the connecting disc 1 in any desired direction by sliding his thumb up on top of one of the protrusions 13. The connecting disc 1 may be indexed as illustrated for instance in FIG. 4. Following a brief period of practice, the operator is able to control the connecting disc 1 designed as indicated in order to produce a signal corresponding to the digits 1, 2, 6 or 7, and so on, without having to look at the connecting disc 1.

Figure 6:
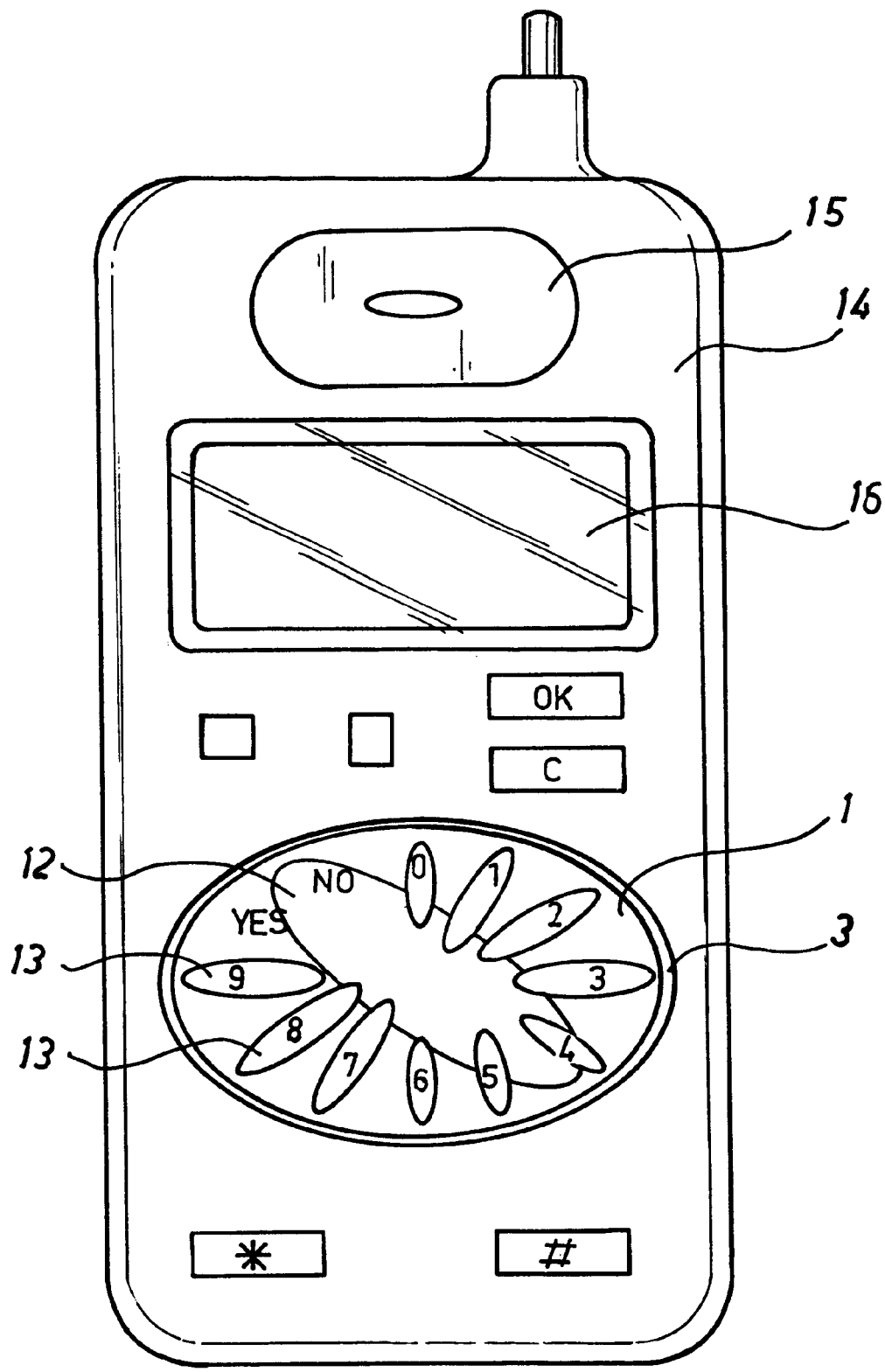
FIG. 6 is a view of one example of application of the connecting disc in accordance with the invention.

In order to illustrate the advantages of the invention more clearly, reference will now be made to FIG. 6, which in-order to exemplify one application of the invention shows a mobile telephone 14 including a receiver 15 and a display 16. This mobile telephone 14 has been fitted with the connecting device in accordance with the invention. The mobile telephone 14 may be conveniently grasped by one hand with the thumb resting in the depression 12. Instead of searching for the various keys on the keypad, as is the general practice, the operator of the inventive object:, in order to dial a telephone number, need only depress his thumb in different directions while easily checking in the display 16 that the correct number is entered. The learning process is very simple because the thumb need never be moved from its basic position but merely be slid laterally in the chosen direction and back, which is in contrast to devices having a keypad or a keyboard, which force the operator to constantly move one finger from one key to the next.

The invention is not limited to the embodiment described and illustrated herein but could be modified in a variety of ways within the scope of the appended claims. The invention is also applicable in a large number of various contexts, in addition to its application in a mobile telephone as shown. As examples should only be mentioned here mini-calculators or remote control devices for television sets and videos.

What is claimed is:

1. A connecting device comprising a resiliently mounted connecting disc (1) which is made from an electrically non-conductive material and which is tiltable about its centre in different directions from a neutral position, in order to bring electrical contact means (6, 10, 11) together for the purpose of generating electrical information signals, characterised in that on one of its sides the connecting disc (1) is provided with or formed with alternating crests (4) and dales (5) departing radially from the centre of the disc (1), a contact field (6) being provided on each crest (4), and in that a printed circuit card (7) is disposed in facing relationship to said disc side, said circuit card (7) likewise being made from an electrically non-conductive material and like the disc (1) formed with alternating crests (8) and dales (9), each dale (9) being provided with at least one pair of contact means (10, 11), and in that the connecting disc (1) is arranged in such a manner that in response to tilting of said disc (1) in any direction, a crest (4) thereon slides into a dale (9) in the circuit card (7) to close the circuit between the contact field (6) on said crest (4) and the pair of contact means (10, 11) on said dale (9).

2. A connecting device as claimed in claim 1, characterised in that on its opposite side said connecting disc (1) is provided with or formed with a depression (12) configured for engagement with the thumb.

3. A connecting device as claimed in claim 1, characterised in that the connecting disc (1) is connected to or formed integrally with a flexible membrane (2) extending peripherally around the connecting disc (1) and being attached to a rim (3) extending peripherally around the membrane (2).

4. A connecting device as claimed in claim 2, characterised in that the connecting disc (1) is connected to or formed integrally with a flexible membrane (2) extending peripherally around the connecting disc (1) and being attached to a rim (3) extending peripherally around the membrane (2).

* * * * *